(12) United States Patent
Weiner et al.

(10) Patent No.: US 9,387,786 B2
(45) Date of Patent: Jul. 12, 2016

(54) STORAGE MODULE

(71) Applicant: Dominos' IP Holder LLC, Ann Arbor, MI (US)

(72) Inventors: Russell Weiner, Ann Arbor, MI (US); Daniel R. Louiselle, Milford, MI (US); Thomas C. Bochenek, Clinton Township, MI (US)

(73) Assignee: DOMINO'S IP HOLDER LLC, Ann Arbor, MI (US)

( * ) Notice: Subject to any disclaimer, the term of this patent is extended or adjusted under 35 U.S.C. 154(b) by 3 days.

(21) Appl. No.: 14/291,891

(22) Filed: May 30, 2014

(65) Prior Publication Data
US 2015/0343933 A1    Dec. 3, 2015

(51) Int. Cl.
*B60R 7/00* (2006.01)
*B60N 3/00* (2006.01)
*B60N 3/10* (2006.01)

(52) U.S. Cl.
CPC ............... *B60N 3/002* (2013.01); *B60N 3/103* (2013.01); *B60N 3/107* (2013.01)

(58) Field of Classification Search
CPC ...................................... B60N 3/002
USPC ........................................ 224/275
See application file for complete search history.

(56) References Cited

U.S. PATENT DOCUMENTS

| | | | |
|---|---|---|---|
| 3,893,569 A * | 7/1975 | Hoch | A47B 31/06 108/44 |
| 4,512,503 A * | 4/1985 | Gioso | B60R 7/043 206/216 |
| 4,946,120 A * | 8/1990 | Hatcher | B60R 11/0252 108/44 |
| 5,390,608 A * | 2/1995 | McLaren | B60N 3/002 108/25 |
| 5,551,616 A * | 9/1996 | Stitt | B60R 7/043 220/631 |
| 5,628,438 A * | 5/1997 | Legrow | B60R 7/043 108/44 |
| D407,243 S | 3/1999 | Thoesen | |
| 5,973,917 A * | 10/1999 | White | B60N 3/001 224/275 |
| 6,015,198 A * | 1/2000 | Stair | B60N 3/002 108/44 |
| 6,400,561 B1 * | 6/2002 | Horton | B60R 11/00 108/38 |
| 6,546,598 B1 * | 4/2003 | Nakanou | B60R 7/02 108/44 |
| D474,733 S | 5/2003 | Webb | |
| 6,763,985 B1 | 7/2004 | Stephenson, Sr. et al. | |
| 6,883,692 B2 | 4/2005 | Harden et al. | |
| 7,591,498 B2 * | 9/2009 | Busha | B60N 2/4686 224/281 |
| 7,607,726 B2 * | 10/2009 | Orlo | B60N 3/004 248/421 |
| 8,910,841 B2 * | 12/2014 | Genung | B60N 3/103 224/274 |
| 9,022,263 B1 * | 5/2015 | Russell | A61G 3/0858 224/281 |
| 2003/0090120 A1 * | 5/2003 | Barber | B60R 5/04 296/37.5 |
| 2004/0245797 A1 * | 12/2004 | Bixby | B60R 7/043 296/37.15 |
| 2006/0091169 A1 * | 5/2006 | Lippert | B60R 7/043 224/275 |

* cited by examiner

*Primary Examiner* — Brian D Nash
*Assistant Examiner* — Derek Battisti
(74) *Attorney, Agent, or Firm* — Brooks Kushman P.C.

(57) ABSTRACT

A storage module for use with a vehicle may include a base securable to the vehicle, and a storage tray attachable to the base. The tray includes a raised deck for receiving a food container. In addition, the tray defines an open area under the raised deck for receiving a user's hand when the food container is received on the deck.

20 Claims, 3 Drawing Sheets

STORAGE MODULE

TECHNICAL FIELD

The present disclosure relates to vehicle storage arrangements for receiving food and beverage items.

BACKGROUND

Various storage trays for use in vehicles for receiving food and/or beverage items are known. Example trays are shown in U.S. Pat. Nos. 6,883,692 and D474,733.

SUMMARY

A storage module according to the disclosure for use with a vehicle includes a base securable to the vehicle, and a storage tray attachable to the base. The tray includes a raised deck for receiving a food container. In addition, the tray defines an open area under the raised deck for receiving a user's hand when the food container is received on the deck.

According to another aspect of the present disclosure, a storage module for a vehicle includes a base that is securable to the vehicle, and a storage tray that is removably attachable to the base. The tray includes a receptacle for one or more bottles, and a raised deck for receiving a pizza box. In addition, the tray defines an open area under the raised deck for receiving a user's hand when the pizza box is received on the deck, such that the user can position the pizza box on the deck while supporting a bottom portion of the pizza box with her hand and then remove her hand from underneath the pizza box without disturbing the contents of the pizza box.

According to yet another aspect of the present disclosure, a food storage module for a vehicle includes a storage tray that is attachable to the vehicle. The storage tray has a raised deck for receiving a food container, and the tray defines an open area under the raised deck for receiving a user's hand when the food container is received on the deck.

While exemplary embodiments are illustrated and disclosed, such disclosure should not be construed to limit the claims. It is anticipated that various modifications and alternative designs may be made without departing from the scope of the invention.

DETAILED DESCRIPTION

Embodiments of the present disclosure are described herein. It is to be understood, however, that the disclosed embodiments are merely examples and that other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
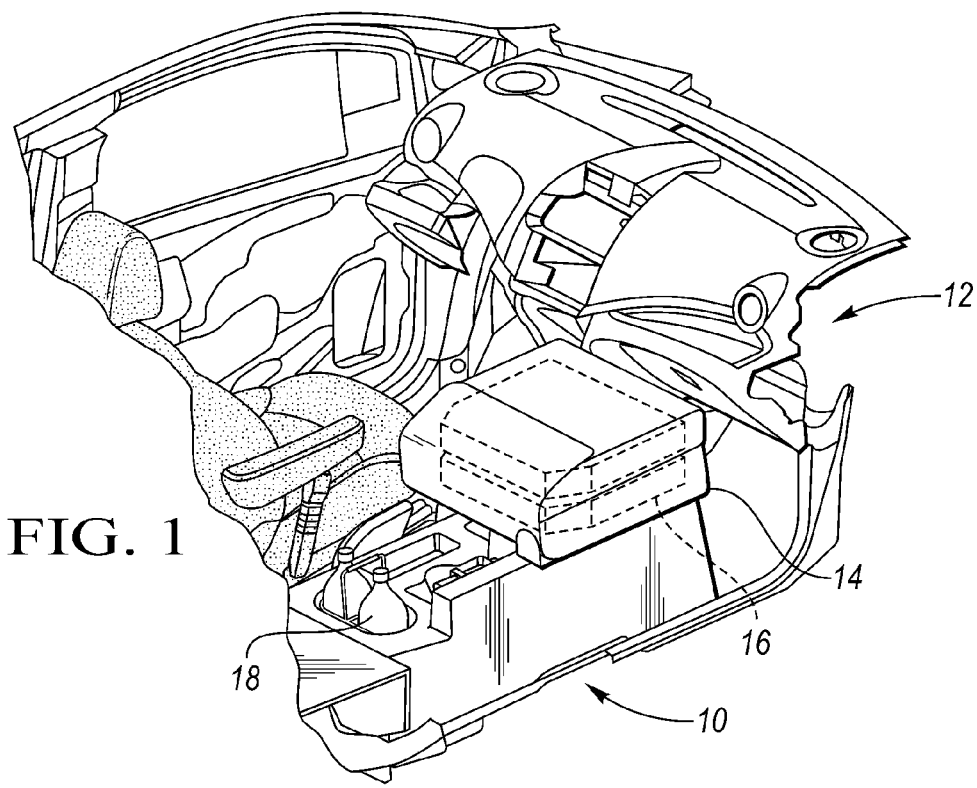
FIG. 1 is a perspective view of a storage module according to the present disclosure mounted in a vehicle.

FIG. 1 shows a storage module 10 according to the present disclosure mounted in a vehicle 12, such as a delivery vehicle (e.g., a pizza delivery vehicle). The storage module 10 may be configured to receive food and/or beverage items for temporary storage during a food delivery, for example. As a more detailed example, the storage module 10 may be configured to receive one or more containers 14, such as food containers or boxes (e.g., pizza boxes 16 that each contain a hot pizza) or a bag that holds one or more food containers or boxes (e.g., pizza boxes 16), and one or more bottles 18, such as soda and/or water bottles. In addition, the storage module 10 may be configured to receive other items as explained below in detail.

Figure 2:
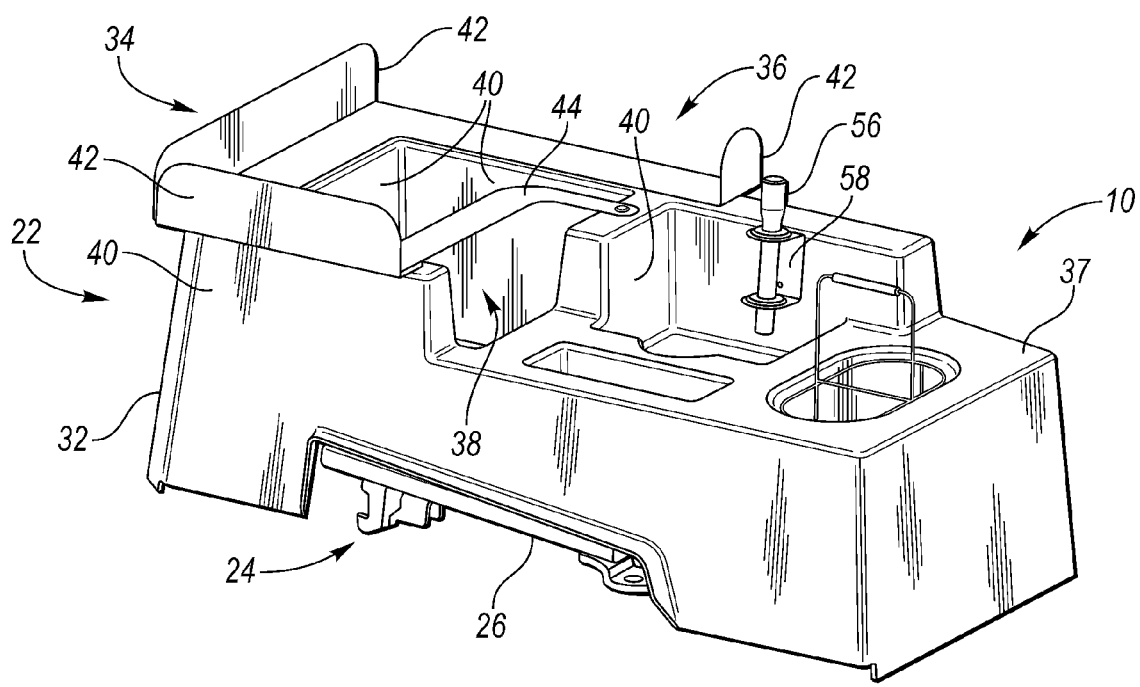
FIG. 2 is a perspective view of the storage module of FIG. 1 showing the storage module mounted on a seat track of the vehicle.
Figure 3:
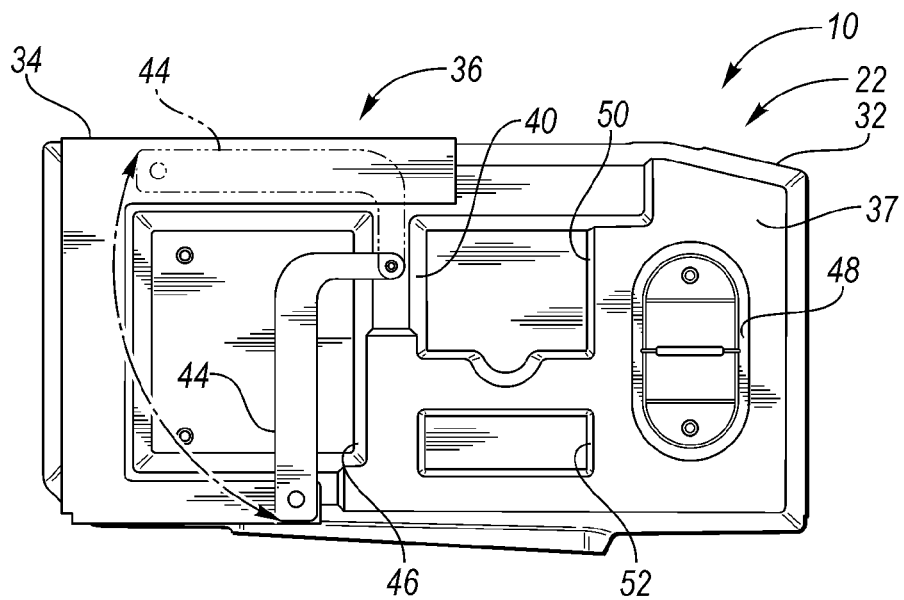
FIG. 3 is a top view of the storage module of FIG. 1.
Figure 4:
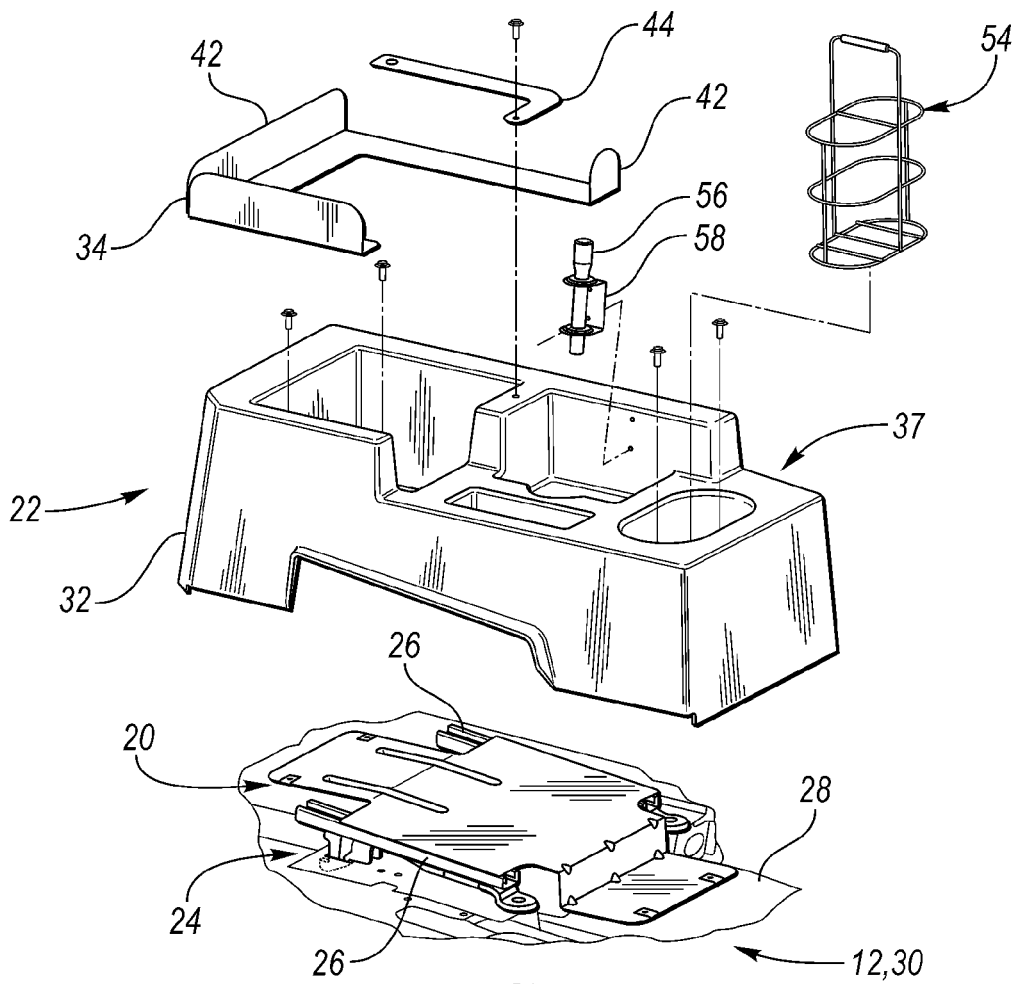
FIG. 4 is an exploded perspective view of the storage module of FIG. 1.

In the embodiment shown in FIGS. 2-4, the storage module 10 includes a base 20 securable to the vehicle 12, and a storage tray 22 that is attachable to the base 20. Thus, in the illustrated embodiment, the base 20 and storage tray 22 are formed as separate components that are attachable together. In another embodiment, the storage module 10 may be formed as one piece.

The base 20 may have any suitable configuration and be made of any suitable material. For example, the base 20 may be formed as an injection or compression molded plastic member, or a stamped metal member. Furthermore, while the base 20 may be secured to the vehicle 12 in any suitable manner, in the illustrated embodiment, the base 20 is configured as an attachment plate that is attachable to or adapted to be supported by one or more portions of a seat track arrangement 24 for supporting a vehicle seat, such as a front passenger side vehicle seat. For example, the base 20 may be attached with screws or other fasteners to first and second (e.g., right and left) lower seat tracks 26, which are mounted on a floor 28 of a vehicle body 30 of the vehicle 12 using bolts or other suitable fasteners. As another example, the base 20 may have first and second end portions, such as lowered end portions, that are attachable directly to the floor 28, and a raised intermediate portion that is supportable on the first and second seat tracks 26.

Likewise, the storage tray 22 may have any suitable configuration and be made of any suitable material, such as plastic and/or metal. In the illustrated embodiment, the storage tray 22 includes a main portion or body 32 made of molded plastic, and an upper portion or support portion 34 made of stamped metal that is attached to the main body 32 such as with fasteners and/or adhesive. In another embodiment, the main body 32 may be made of two or more plastic pieces that are attached together in any suitable manner, such as with an adhesive and/or by an ultrasonic welding process. In yet another embodiment, the main body 32 and the support portion 34 may be made as a single piece, such as a single plastic piece.

In the embodiment shown in FIGS. 2-4, the main body 32 and the support portion 34 cooperate to form a raised deck 36 for receiving or supporting the container or containers 14. The deck 36 is generally flat and is raised with respect to a lower portion 37 of the main body 32. For example, the deck 36 may be raised at least 3 inches (e.g., in the range of 3 to 8 inches) above the lower portion 37. The main body 32 further defines an open area 38 under the raised flat deck 36 for receiving a user's (e.g., driver's) hand when a container 14 is received on the deck 36. With such a configuration, the user can position the container 14 on the deck while supporting a bottom portion of the container 14 with her hand and then remove her hand from underneath the container 14 without disturbing the contents of the container 14.

The main body 32 may include two or more upright walls 40 that cooperate with the support portion 34 to form the raised deck 36. For example, the upright walls 40 may define a planar horizontal top surface upon which a planar or flat section of the support portion 34 is disposed. As shown in FIG. 2, the open area 38 may be open on a side of the storage tray 22, such as a rear side of the storage tray 22 when the storage module 10 is positioned in the vehicle 12, and beneath the raised deck 36 to facilitate insertion and removal of the user's hand from beneath the container 14 when the container 14 is received on the deck 36.

In the illustrated embodiment, the support portion 34 includes upright or vertically extending sides or flanges 42 for inhibiting sliding movement of the container 14 when the container 14 is received on the deck 36. In another embodiment, the support portion 34 may include a lip, such as a peripheral lip, for inhibiting sliding movement of the container 14.

The storage module 10 may also include a support member 44, such as a generally j-shaped support arm, that is movably attached to the storage tray 22 and movable to a support position for supporting the container 14. As a more detailed example, the support member 44 may be pivotally attached to the storage tray 22 such that the support member 44 is pivotable about a vertical axis between a stowed position (shown in phantom lines in FIG. 3) and a support position (shown in solid lines in FIGS. 2 and 3). The support member 44 is designed to extend over the open area 38 and under the container 14 when the support member 44 is in the support position and the container 14 is positioned on the deck 36. If desired, the support member 44 may be pivoted to the support position after the container 14 has been positioned on the deck 36, such that a user may use a single hand positioned beneath the container 14 during placement of the container 14 on the deck 36. Likewise, the support member 44 may be pivoted back to the stowed position prior to removing the container 14 from the deck 36 if desired to facilitate removal of the container 14 from the deck 36 using a single hand positioned beneath the container 14. In another embodiment, the storage module 10 may be provided without the support member 44.

The main body 32 further includes one or more storage receptacles for receiving other items, such as food, beverages and/or other items. For example, the open area 38 may include or extend into a receptacle 46 for receiving one or more items, such as one or more salad containers, beneath the container 14, such that the user may still position her hand under the container 14 when the container 14 is positioned on the deck 36 and one or more additional containers are received in the receptacle 46. As another example, the main body 32 may include one or more receptacles formed in the lower portion 37, such as first, second and third receptacles 48, 50 and 52. The first receptacle 48 may be a beverage receptacle that is configured to receive one or more beverage bottles, such as 2-liter water or soda bottles. The second and third receptacles 50 and 52 may be configured to receive other items, such as dipping cups, napkins, pens and customer receipts.

The storage module 10 may further include a basket 54 that is positionable in and removable from the first receptacle 48, and that is configured to receive one or more beverage bottles. In addition, the storage module 10 may include other items to facilitate a delivery, such as a flashlight 56 that is removably received in a bracket 58 mounted to the storage tray 22.

Figure 5:
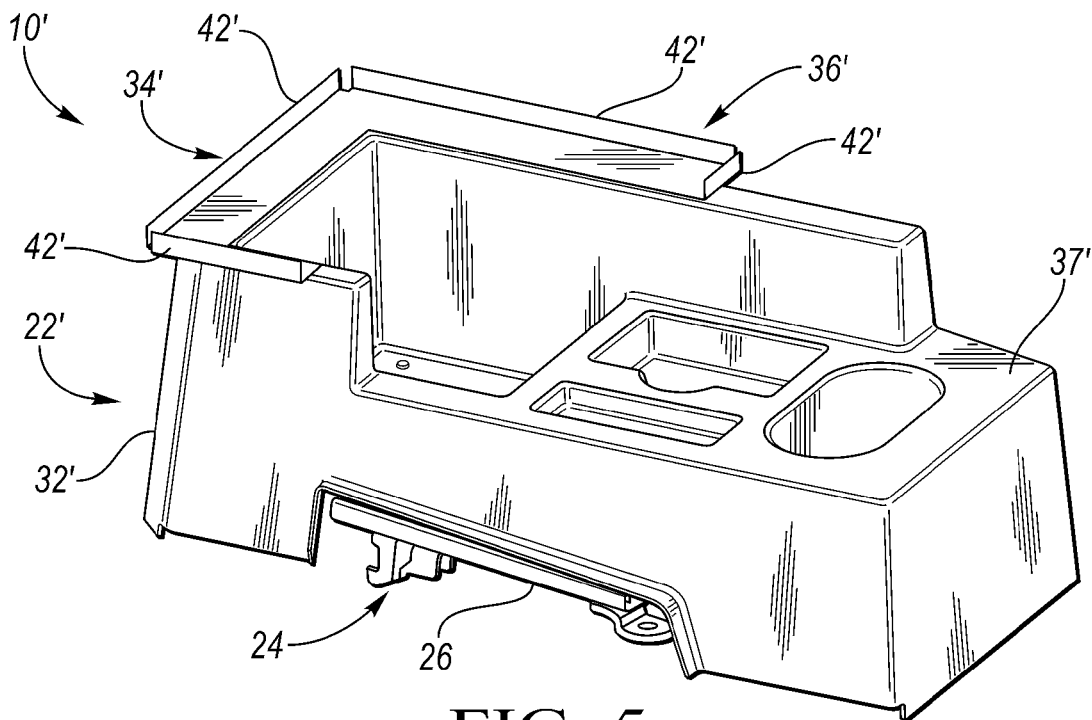
FIG. 5 is a perspective view of a second embodiment of a storage module according to the present disclosure.
Figure 6:
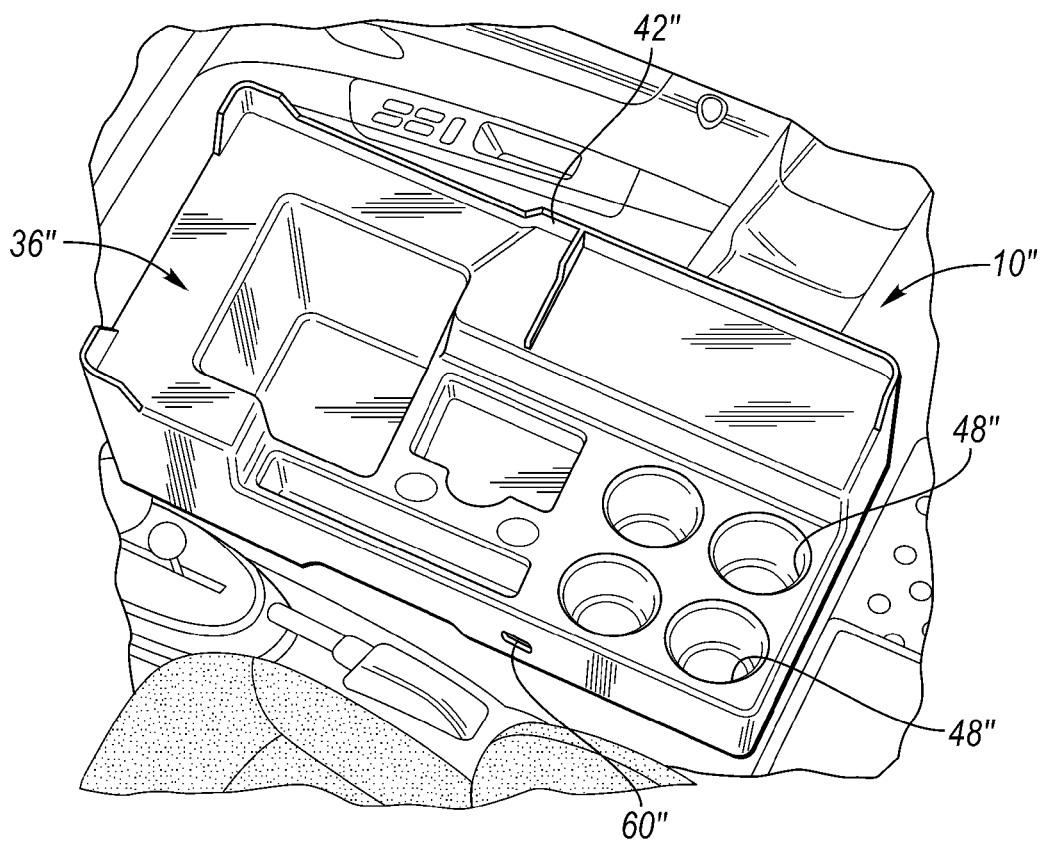
FIG. 6 is a perspective view of a third embodiment of a storage module according to the present disclosure.

FIGS. 5 and 6 show additional embodiments 10' and 10" of a storage module according to the present disclosure. The storage module 10' is similar to the storage module 10, and similar components are identified with the similar reference numbers (except the reference numbers of the storage module 10' each include a prime mark). The storage module 10', however, includes a support portion 34' having upright (e.g., vertically extending) sides or flanges 42' that are disposed on four sides of the bag 14 or other container, when the bag 14 or other container is received on the deck 36'.

The storage module 10" shown in FIG. 6 is also similar to the storage module 10, and similar components are identified with the similar reference numbers (except the reference numbers for the storage module 10" each include a double prime mark). The storage module 10" is formed as a one-piece plastic component, or multiple components attached together in any suitable manner, such as with adhesive or by a welding process. Furthermore, the storage module 10" includes an integral rim or lip 42" that extends along sides of raised deck 36" for inhibiting sliding movement of the container 14, when the container 14 is received on the deck 36". In the illustrated embodiment, the deck 36" also extends along an entire length of the storage module 10". In addition, the storage module 10" includes multiple receptacles 48" that are each configured to receive a single bottle, such as a 2 liter water or soda bottle.

The storage module 10" may be attached to vehicle 12 in any suitable manner. For example, the storage module 10" may include a base (not shown) that is attachable to vehicle 12 in the same manner as described above with respect to the storage module 10, and the storage tray 22" of the storage module 10" may be attached to that base. As another example, the storage tray 22" of storage module 10" may be attached directly to the vehicle 12. As a more detailed example, the storage tray 22" may have a slot 60" for receiving a seat belt (not shown) of the vehicle 12. With such a configuration, the seatbelt may be inserted into and through the slot of the storage tray 22", and the seatbelt may then be attached to a corresponding seatbelt buckle or latch in order to secure the storage tray 22" to the vehicle 12.

As shown in the Figures, each of the above embodiments includes a raised deck 36, 36', 36" and an open area 38, 38', 38" under the raised deck that may also be open on a side of the corresponding storage tray 22, 22', 22". Therefore, with each of the above embodiments, a user can position a container 14 on the corresponding raised deck 36, 36', 36" while supporting a bottom portion of the container 14 with her hand, and then remove her hand from underneath the container 14 without disturbing the contents of the container 14. Likewise, the user can insert her hand through the open side of the storage tray 22, 22', 22" and into the open area 38, 38', 38" in order to position her hand beneath the container 14 to remove the container 14 from the corresponding raised deck 36, 36', 36". Advantageously, each of the above activities can be performed using a single hand of the user.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. For example, the storage module 10 and the storage module 10' may each be provided without a base, and the corresponding storage tray 22, 22' may be attached directly to the vehicle 12. As a more specific example, the corresponding storage tray 22, 22' may be attached to the vehicle 12 using one or more suitable fasteners, or by using a seatbelt of the vehicle 12 as described above with respect to the storage module 10".

What is claimed is:

1. A storage module for a vehicle, the storage module comprising:
    a base securable to the vehicle; and
    a storage tray attachable to the base and including a fixed lower portion and a raised deck next to the lower portion and raised above the lower portion for supporting a food container, wherein the tray includes at least three upright walls that at least partially form the raised deck and define an open area below the raised deck for receiving a user's hand when the food container is supported by the deck, wherein the open area is open on at least one side of the tray such that the open area is open toward the lower portion, and the open area is open at a top of the tray, and wherein the at least three upright walls include first and second upright walls that are non-coplanar and that extend longitudinally in a same direction, and the first and second upright walls have different lengths.

2. The storage module of claim 1 wherein the deck includes a lip for inhibiting sliding movement of the food container when the food container is received on the deck.

3. The storage module of claim 1 wherein the tray comprises a main body that includes the lower portion and the at least three upright walls, and a support portion attached to the main body that at least partially defines the deck.

4. The storage module of claim 3 wherein the main body and the support portion are formed as a one piece.

5. The storage module of claim 3 wherein the main body and the support portion are made of different materials.

6. The storage module of claim 3 wherein the support portion includes vertically extending sides for inhibiting sliding movement of the food container when the food container is received on the deck.

7. The storage module of claim 1 wherein the lower portion of the tray includes a receptacle for one or more 2-liter bottles.

8. The storage module of claim 7 wherein the lower portion of the tray further comprises one or more additional receptacles for one or more other items.

9. The storage module of claim 1 further comprising a basket that is removably receivable in a receptacle formed in the tray, wherein the basket is configured to hold two bottles, and wherein the basket includes a laterally extending member configured to extend between the bottles.

10. The storage module of claim 1 further comprising a support member pivotally attached to the tray and being pivotable about a vertical axis between a stowed position and a support position, wherein the support member is designed to extend over the open area and under the food container when the support member is in the support position and the food container is supported by the deck.

11. The storage module of claim 10 wherein the support member is generally j-shaped such that the support member extends from one upright wall to another upright wall when the support member is in the support position.

12. The storage module of claim 1 wherein the base comprises an attachment plate that is directly attachable to a seat track of the vehicle.

13. The storage module of claim 1 Wherein the base and the tray are formed as one piece.

14. A storage module for a vehicle having a seat track, the storage module comprising:
    a base including an attachment plate that is mountable directly on the seat track; and
    a storage tray that is removably attachable to the base, the tray including a receptacle for one or more bottles, and a raised deck for receiving a pizza box, wherein the tray includes at least three upright walls that at least partially form the raised deck and define an open area below the raised deck for receiving a user's hand when the pizza box is received on the deck, such that the user can position the pizza box on the deck while supporting a bottom portion of the pizza box with her hand and then remove her hand from underneath the pizza box, and wherein the at least three upright walls include first and second upright walls that are non-coplanar and that extend longitudinally in a same direction, and the first and second upright walls have different lengths.

15. The storage module of claim 14 wherein the attachment plate is attachable directly to the seat track with one or more fasteners.

16. A food storage module for a vehicle, the storage module comprising:
    a storage tray that is attachable to the vehicle, the tray including a fixed lower portion and a raised deck next to the lower portion and raised above the lower portion for supporting a food container, wherein the tray includes at least three upright walls that at least partially form the raised deck and define an open area below the raised deck for receiving a user's hand when the food container is supported by the deck, wherein the open area is open on at least one side of the tray such that the open area is open toward the lower portion, and the open area is open at a top of the tray, and wherein the at least three upright walls include first and second upright walls that are non-coplanar and that extend longitudinally in a same direction, and the first and second upright walls have different lengths.

17. The storage module of claim 16 further comprising a support member pivotally attached to the tray and being pivotable about a vertical axis between a stowed position and a support position, wherein the support member is designed to extend over the open area and under the food container when the support member is in the support position and the food container is supported by the deck.

18. The storage module of claim 17 wherein the support member is generally j-shaped and is configured to extend from one upright wall to another upright wall when the support member is in the support position, and wherein the support member is configured to be located entirely above two of the upright walls when the support member is in the stowed position.

19. The storage module of claim 16 wherein the lower portion includes one or more storage receptacles.

20. The storage module of claim 16 further comprising a support portion that cooperates with the at least three upright wails to form the raised deck, wherein the at least three upright walls define a planar top surface, and the support portion is disposed on the planar top surface for supporting the food container.

* * * * *